(12) United States Patent
Cordonnier

(10) Patent No.: US 6,659,147 B1
(45) Date of Patent: Dec. 9, 2003

(54) TIRE CROWN REINFORCEMENT

(75) Inventor: François-Jacques Cordonnier, Clermont-Ferrand (FR)

(73) Assignee: Compagnie Generale des Etablissements Michelin-Michelin & Cie (FR)

(*) Notice: Subject to any disclaimer, the term of this patent is extended or adjusted under 35 U.S.C. 154(b) by 0 days.

(21) Appl. No.: 09/558,091

(22) Filed: Apr. 26, 2000

Related U.S. Application Data

(63) Continuation of application No. PCT/EP98/06799, filed on Oct. 27, 1998.

(30) Foreign Application Priority Data

Nov. 5, 1997 (FR) .............................................. 97 14010

(51) Int. Cl.[7] .............................. B60C 9/18; B60C 9/22
(52) U.S. Cl. ........................ 152/526; 152/535; 152/531; 152/538
(58) Field of Search ................................ 152/526–529, 152/531, 538, 535

(56) References Cited

U.S. PATENT DOCUMENTS

| | | | | |
|---|---|---|---|---|
| 1,800,179 A | * | 4/1931 | Darrow | 428/298.4 |
| 5,225,013 A | * | 7/1993 | Ohsawa et al. | 152/526 |
| 5,271,445 A | | 12/1993 | Kohno et al. | |
| 5,662,752 A | * | 9/1997 | Nakano | 152/531 |

FOREIGN PATENT DOCUMENTS

| | | | |
|---|---|---|---|
| JP | 02081708 | * | 3/1990 |
| JP | 03104706 | * | 5/1991 |
| JP | 05338406 | * | 12/1993 |
| JP | 06191210 | * | 7/1994 |
| JP | 06191219 | * | 7/1994 |
| JP | 11011113 | * | 1/1999 |
| WO | WO 97/30856 | * | 8/1997 |
| WO | WO 9730857 | | 8/1997 |
| WO | WO 97/30857 | * | 8/1997 |

OTHER PUBLICATIONS

Patent Abstracts of Japan, Publication No. 02081708 dated Mar. 22, 1990, Bridgestone Corp., Pneumatic Tire, Abstract.
Patent Abstracts of Japan, Publication No. 06191219 dated Jul. 12, 1994, Bridgestone Corp., Pneumatic Radial Tire for Heavy Load, Abstract.

* cited by examiner

*Primary Examiner*—Michael W. Ball
*Assistant Examiner*—Justin Fischer

(57) ABSTRACT

A tire with radial carcass reinforcement, having a crown reinforcement which includes at least two working crown plies made of inextensible cables, crossed from one ply to the other, and an additional ply, axially continuous and formed of undulating metallic elements orientated essentially parallel to the circumferential direction and positioned between the working plies.

6 Claims, 2 Drawing Sheets

TIRE CROWN REINFORCEMENT

This is a continuation of PCT/EP 98/06799, filed Oct. 27, 1998.

BACKGROUND OF INVENTION

The invention concerns a tire with radial carcass reinforcement anchored in each bead to at least one bead wire and comprising a crown reinforcement consisting of at least two so-called working plies, superposed and formed by parallel wires or cords in each ply and crossed from one ply to the next by forming angles with the circumferential direction of the tire, the absolute value of which can range between 10° and 60°.

International application WO 97/30857, with a view to lowering the operating temperature of a heavy truck-type tire with radial carcass reinforcement while providing a solution that is both effective and economical, recommends adding to said carcass reinforcement a crown reinforcement comprising at least two working crown plies of inextensible cords, crossed from one ply to the next by forming angles of between 10° and 45° with the circumferential direction, characterized in that an axially continuous additional ply, made up of wire elements, oriented roughly parallel to the circumferential direction, is positioned radially between the working plies, said additional ply having an axial width that can be equal to at least 1.05 times the axial width of the widest working crown ply.

In that context, the additional ply can be made up of so-called semielastic continuous steel wire cords, that is, cords with relative elongations at rupture exceeding 2%. Those cords make it possible to obtain a level of rigidity suitable for harmonious distribution of the circumferential tension between the working crown plies and the additional ply. Said cords are advantageously described as "double-modulus," that is, presenting a tensile stress/relative elongation curve having shallow slopes for low elongations and a roughly constant and steep slopes for high elongations. The very low modulus before curing, for elongations less than 2%, make possible an increase in the circumferential development of the additional ply during curing of the tire.

The additional ply can also be made up of steel wire cords circumferentially oriented and cut so as to form sections much shorter than the circumferential length of the ply, the gaps between sections being axial offset from one another. Such an embodiment makes it possible to endow the additional ply with any desired rigidity.

The choice of elastic or cut cords for reinforcement of the additional ply does not afford the best fatigue strength of said ply, owing to a reduction of breaking load of the elastic cords, as well as to the existence of stress concentrations in the calendering mix of the cut cords.

French patent application FR 97/09996 shows that better fatigue strength of the additional ply of circumferential wire reinforcement elements, combined with easier industrial production, can be obtained thanks to the use of corrugated wire elements as reinforcing elements in the plane of the ply, placed radially between the working plies, the corrugations of the reinforcing elements being parallel to each other, in phase and oriented parallel to the circumferential direction, and the ratio of linear rigidity of the additional ply to the sum of linear rigidities of the other plies of the crown reinforcement being equal at most to 0.10.

Japanese patent application JP 02/081708 describes a crown reinforcement consisting of two corrugated reinforcing elements, the ratio of amplitude of the corrugations to the wavelength of the same corrugations being less at the edges than at the center of the reinforcement. Said ratio makes possible a greater rigidity at the ply edges and thus avoids a radial elevation of the tread edges.

Considering the progress achieved in durability of the treads for heavy truck tires, as well as in endurance of the crown reinforcement, the endurance of the crown reinforcements needs to be improved from the standpoint of resistance to separation between carcass reinforcement and crown reinforcement, resistance to separation between the working crown plies and fatigue strength of the circumferentially oriented cords of the additional ply.

SUMMARY OF THE INVENTION

The tire with radial carcass reinforcement, according to the invention, having a crown reinforcement comprising at least two working crown plies made up of inextensible wire reinforcing elements, crossed from one ply to the next, and an axially continuous additional ply, made up of steel wire reinforcing elements, corrugated in the plane of the ply, being placed radially between the working plies and having an axial width $L_{32}$ at least equal to 50% of the maximum axial width of the carcass reinforcement, is characterized in that the reinforcing elements are steel, corrugated in the plane of the ply and of greater diameter than that of the reinforcing elements of the plies of the crown reinforcement situated radially on both sides of said additional ply, the corrugations of the elements being parallel to one another, in phase and oriented parallel to the circumferential direction, so that the ratio of amplitude of wavelengths of the corrugations of corrugated elements decreases axially from the center to the edges of said ply, reaching a minimum at said edges.

Corrugated wire elements whose mean direction is circumferential are elements whose corrugations have axes in a direction forming an angle with the circumferential direction within the span of ±5° with respect to 0°.

Likewise, the ratio of amplitude to wavelength of the corrugations will preferably range between 2% and 15%, the amplitude of a corrugation being by definition measured crest to crest. The ratio of amplitude to wavelength, ranging between 2% and 15%, makes it possible to have reinforcing elements not interfering with shaping of the tire blank in the vulcanization mold, while making it possible, after curing, mounting and inflation of the tire, to obtain the crown reinforcement linear rigidity necessary for improvement of the endurance of said crown reinforcement.

The additional ply can have an axial width equal to at least 1.05 times the axial width of the widest working crown ply.

The additional ply of corrugated circumferential elements, in the particular case of tires of H/S shape ratio equal to at least 0.50, can be used in combination with a first working crown ply, the meridian curvature of which is roughly equal to the meridian curvature of the subjacent carcass reinforcement, so as to be able to place it parallel to said carcass reinforcement without interposed sections. The additional ply is then provided with a roughly zero curvature on being separated from the first working ply by appropriate sections of roughly triangular shape.

The crown reinforcement, according to the invention, will advantageously be completed by a so-called protecting crown ply made up of straight elastic steel wire cords, oriented relative to the circumferential direction at an angle roughly equal to the angle formed by the cords of the radially outermost working crown ply and the axial width of which can be either less or greater than the average width of the working plies.

The characteristics and advantages of the invention will be better understood by means of the specification which follows and refers to the drawing, nonlimitatively illustrating a working example.

DESCRIPTION OF PREFERRED EMBODIMENTS

Figure 1:
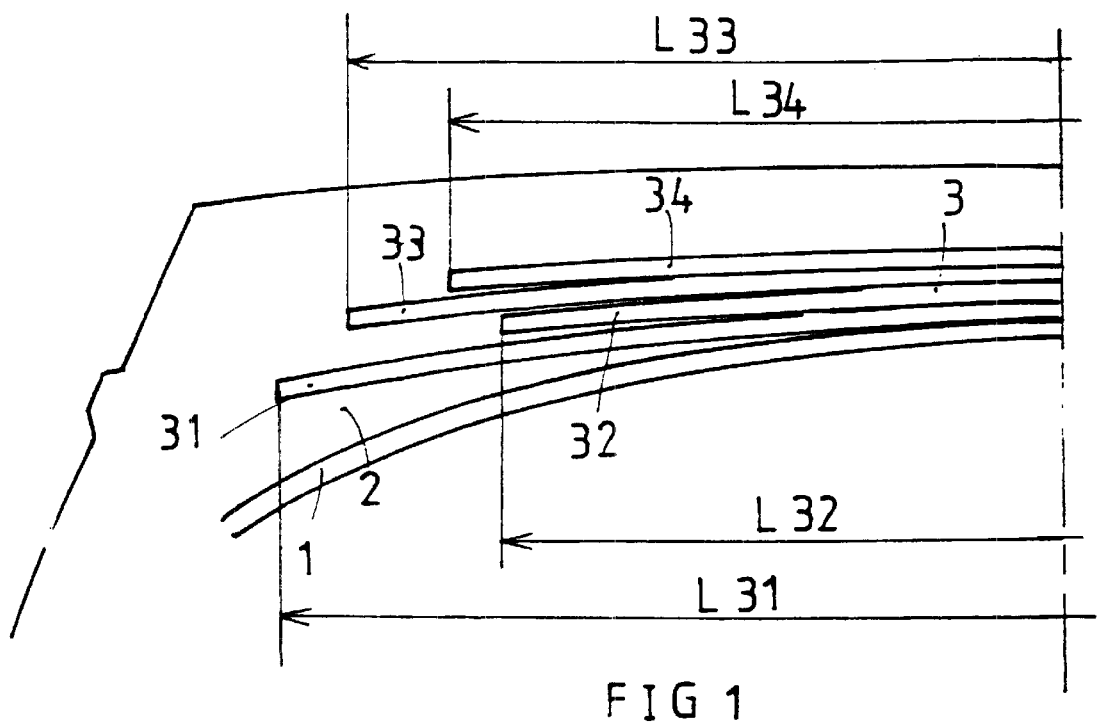
FIG. 1 schematically represents, in meridian section, a crown reinforcement according to the invention.
Figure 2:
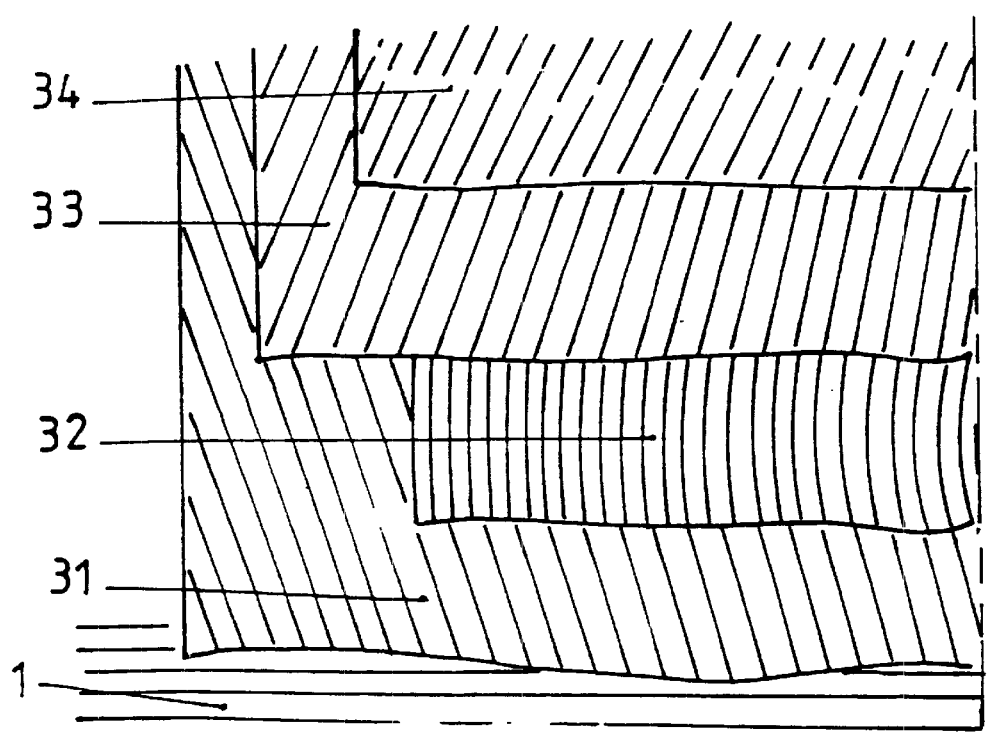
FIG. 2 represents an exploded plan view of said reinforcement.
Figure 3:
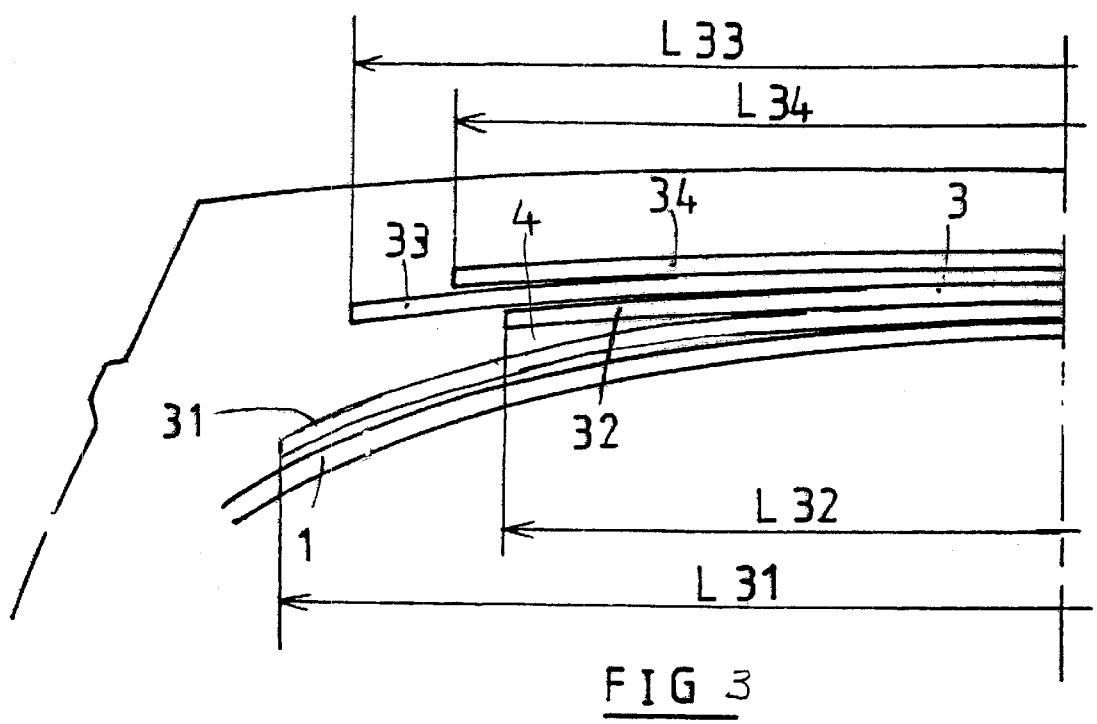
FIG. 3 schematically represents, in meridian cross section, a crown reinforcement according to another embodiment of the invention.

The 315/80 R 22.5 X size tire has a shape ratio equal to 0.8, the shape ratio being the ratio of height of the tire on its mounting rim to its maximum axial width. Said tire contains a radial carcass reinforcement 1 anchored in each bead to at least one wire by forming a turn-up and made up of a single wire cord ply. The carcass reinforcement 1 is hooped by a crown reinforcement 3 comprising, radially from inside to outside:

A first working crown ply 31 formed by 4+10×0.28 nonhooped, inextensible steel wire cords having a diameter of 1.25 mm, parallel to each other in the ply and placed with a pitch of 2 mm (measured perpendicular to said cords). They are oriented relative to the circumferential direction at an angle a ranging between 10° and 60° and in the case described equal to 22°. Said first ply is radially separated on its edges from the subjacent carcass reinforcement 1 by rubber compound sections 2 of roughly triangular shape;.

Surmounting the first working crown ply 31, by an additional ply 32 formed by inextensible, nonhooped 3+9+15×0.23 steel wire cords of diameter equal to 1.4 mm and separated from one another by a pitch equal to 2 mm. Said cords present, axially in the center of the additional ply, corrugations of crest to crest amplitude equal to 12 mm and a wavelength equal to 100 mm, that is, approximately 1/30 the circumferential length of the ply 33. On the other hand, at the edges of said ply 32, the amplitude decreases down to 4 mm, while the wavelength of said corrugations remains unchanged. The axial width of the additional ply 32 is subdivided into nine axial strips of equal width and, in the present case, of 18 mm; a center strip and, on each side of the equatorial plane, four lateral strips. The center strip is composed of corrugated cords whose amplitude is equal to 12 mm, while the two lateral strips closest to the center strip are formed by corrugated cords whose amplitude is equal to 10 mm, and so on to the two lateral strips constituting the edges of the ply, where the amplitude is 4 mm after a decrease of 2 mm from strip to strip. Said elements are oriented at 0°, that is, the axes of the corrugations representing them are circumferential;

Then a second working crown ply 33 made up of wire cords identical to those of the first ply 31 arranged with the same pitch and forming an angle β with the circumferential direction opposite angle ∝ and, in the case shown, equal to said angle of 22° (but which can be different from said angle ∝);

Finally, by a last ply 34 of so-called elastic steel wire cords, oriented circumferentially at an angle ∝ in the same direction as angle β and equal to said angle β (but which can be different), that last ply being a so-called protection ply, and the so-called elastic cords being cords having a relative elongation on rupture equal to at least 4%.

The axial width $L_{31}$, of the first working ply 31 is approximately equal to 0.71 times the maximum axial width of the carcass reinforcement 1 measured between the middle fibers of the carcass reinforcement in each side wall, i.e., 226 mm, which, for a tire of ordinary shape, is roughly equal to the width of the tread, in this example being 235 mm. The axial width $L_{33}$ of the second working ply 33 is less than the width $L_{31}$ of the first working ply 31 by a quantity equal to 0.07 times the maximum axial width of the carcass reinforcement, i.e., a width of 204 mm. The axial width $L_{32}$ of the additional ply 32 is roughly equal to 162 mm, which represents approximately 0.51 times the maximum axial width of the carcass reinforcement. The last crown ply 34, known as protection ply, has a width $L_{34}$ at least equal to and, in the case described, very slightly greater than the width $L_{32}$ of the additional ply 32, i.e., 170 mm.

Another tire variant according to the invention, has a first working crown ply 31 radially adjacent and parallel to the carcass reinforcement 1, its meridian curvature being roughly equal to the meridian curvature of the subjacent carcass reinforcement 1, the cords of the carcass ply and working ply respectively being separated by a slight constant thickness of rubber compound. The axially outer edges of the working ply 31 are then separated from the additional ply 32 of corrugated circumferential cords by triangular sections 4, the thickness of rubber between ply 31 and ply 32, measured at the axially outer end of ply 32, being roughly equal to 2 mm.

I claim:

1. A truck tire with radial carcass reinforcement, having a crown reinforcement comprising at least two working crown plies made up of inextensible wire reinforcing elements, crossed from one ply to the next by forming opposite but equal angles with the circumferential direction ranging between 10° and 60°, and an axially continuous additional ply, the additional ply being placed between radially adjacent ones of the at least two working crown plies and being made up of wire reinforcing elements of greater diameter than that of the reinforcing elements of the radially adjacent ones of the working plies and having an axial width equal to at least 50% of the maximum axial width of the carcass reinforcement, wherein the reinforcing elements of the additional ply are steel and are corrugated in the plane of the ply, the corrugations being parallel to one another, in phase and oriented parallel to the circumferential direction, so that the ratio of amplitude to wavelength of the corrugated elements decreases axially from the center to the edges of said additional ply, reaching a minimum at said edges.

2. A tire according to claim 1, in which the ratio of amplitude to wavelength of the corrugations of the reinforcing elements of the additional ply ranges between 2% and 15%.

3. A tire according to claim 1 in which the ratio of amplitude to wavelength of the corrugated elements progressively decreases radially from the center of the ply to its edges.

4. A tire according to claim 1 in which the radially-innermost working crown ply has a meridian curvature roughly equal to the meridian curvature of the subjacent carcass reinforcement and is placed parallel to said carcass reinforcement, the additional ply is placed radially adjacent to the radially-innermost working crown ply, triangular sections of rubber are interposed between the axial edges of the radially-innermost working crown ply and the additional ply, and the curvature of the additional ply is roughly zero.

5. A tire according to claim 1 in which the crown reinforcement further includes a protection ply, radially situated above the radially-outermost working crown ply, and comprising straight elastic steel wire cords, circumferentially oriented at an angle α in the same direction as an angle B of the elements of the radially-outermost working crown ply, and the axial width of the protection ply is equal to at least the axial width of the additional ply.

6. A track tire with radial carcass reinforcement, having a crown reinforcement comprising at least two working crown plies made up of inextensible wire reinforcing elements, crossed from one ply to the next by forming angles with the circumferential direction ranging between 10° and 60°, and an axially continuous additional ply, the additional ply being placed between radially adjacent ones of the at least two working crown plies and being made up of wire reinforcing elements of greater diameter than that of the reinforcing elements of the radially adjacent ones of the working plies and having an axial width equal to at least 50% of the maximum axial width of the carcass reinforcement, wherein the reinforcing elements of the additional ply are steel and are corrugated in the plane of the ply, the corrugations being parallel to one another, in phase and oriented parallel to the circumferential direction, so that the ratio of amplitude to wavelength of the corrugated elements decreases axially from the center to the edges of said additional ply, reaching a minimum at said edges, and in which the crown reinforcement further includes a protection ply, radially situated above the radially-outermost working crown ply, and comprising straight elastic steel wire cords, circumferentially oriented at an angle α in the same direction as an angle β of the elements of the radially-outermost working crown ply, and the axial width of the protection ply is equal to at least the axial width of the additional ply.

* * * * *